Patented Nov. 24, 1931

1,832,913

UNITED STATES PATENT OFFICE

STUART M. PHELPS, OF PITTSBURGH, PENNSYLVANIA

CERAMIC

No Drawing. Application filed September 18, 1929. Serial No. 393,596.

My invention relates to the preparation of a ceramic body, and specifically of a porous ceramic body, adapted after its production to be impregnated with substances capable of being applied in liquid condition, such as sulphur or a phenol condensation product in solution, to afford a dense and durable mass, resistant to deterioration. It has been proposed to form a substitute for soapstone by mingling with a body of clay a combustible substance in finely divided state, shaping and burning the so modified clay, and in so doing producing a porous solid; then to fill the porous solid with such a filling substance as those indicated. My present invention is primarily concerned with improvement in the production of such an article.

Beginning with clay in native state suitable for the purpose indicated, I mix with the clay as a suitable combustible material, designed to give the intended ultimate porosity, pitch in finely divided state. Coal-tar is the pitch which is cheapest and most readily available and is serviceable for the end in view. I mix coal-tar pitch in finely divided condition with the clay, in the proportion of one to ten. This will be understood to be an exemplary mix; the proportions may be varied. When the mixture has been effected of clay and pitch, I divide the batch into two parts. One part I work to consistency for molding, ordinarily by adding water. I mold the substance to shape, dry, and bake it. The heat of baking melts the pitch and causes the pitch to adhere to the clay particles. The baked article has two properties which a baked article of clay alone does not possess: it will not take up water and (an allied property) it will not slake, that is to say lose its form and become a paste, when immersed in water. At the same time, no change is effected in other properties of the particles of clay. Those properties remain unchanged. The only change is in the property of the body as a whole, and that change I have just characterized.

Having so produced a baked article, I crush it and mix with it the other portion of the divided batch—that is to say, with a quantity of the unbaked mixture of clay and pitch. In this second mixture the unbaked component serves as the binder for the baked and crushed component. Having effected this second mixture, I shape it to the ultimate shape desired, and then dry and fire the shaped article, burning out the pitch, and leaving the desired porous ceramic. In so proceeding I have in the ultimately shaped material before drying a smaller water content than would otherwise be necessary, and in consequence there is less shrinkage and warpage in drying, and in consequence a superior ultimate product.

In the foregoing description I have said that I ordinarily use water in working the material to consistency for molding. I need not use water; I may use instead a liquid which is a solvent of pitch, benzene, for example. I will not employ benzene, for example, in such quantity as to effect solution, but in sufficient quantity merely to soften the pitch, and by so softening the pitch to render the whole mass plastic. Using a liquid which is a solvent of pitch, I may proceed with an operation which in all other respects is identical with that described. If such a solvent as benzene, for example, be used, it will be understood that because of its volatility it will tend to escape from the mass, both before and after its shaping, in more marked degree than water; it will be understood that in the baking it will be completely removed; and it will be further understood that, inasmuch as in the use of benzene or other solvent of pitch no water is employed, there will be no such shrinkage and warpage as is incident to the treatment of a mass which has been rendered plastic by water.

I claim as my invention:

1. The method herein described of producing a ceramic which consists in preparing a mixture of clay and pitch, baking the mixture, crushing the baked product, mixing the crushed baked product with another body of unbaked mixture of clay and pitch, and shaping and firing such second mixture.

2. The method herein described of producing a porous ceramic which consists in preparing a mixture of clay and pitch, separating the mixture into two parts, baking and crushing one of the parts, mixing the baked and crushed part with the remaining unbaked part, and shaping and firing such second mixture.

In testimony whereof I have hereunto set my hand.

STUART M. PHELPS.